Feb. 1, 1949.　　　　E. W. RICKMEYER　　　　2,460,655
APPARATUS FOR DETERMINING THE
PERMEABILITY OF MATERIALS
Filed Nov. 16, 1945　　　　　　　　　　　4 Sheets-Sheet 1

Inventor:
Ernst Walter Rickmeyer
By Francis H. Pest
Attorney.

Feb. 1, 1949.  E. W. RICKMEYER  2,460,655
APPARATUS FOR DETERMINING THE
PERMEABILITY OF MATERIALS
Filed Nov. 16, 1945  4 Sheets-Sheet 2
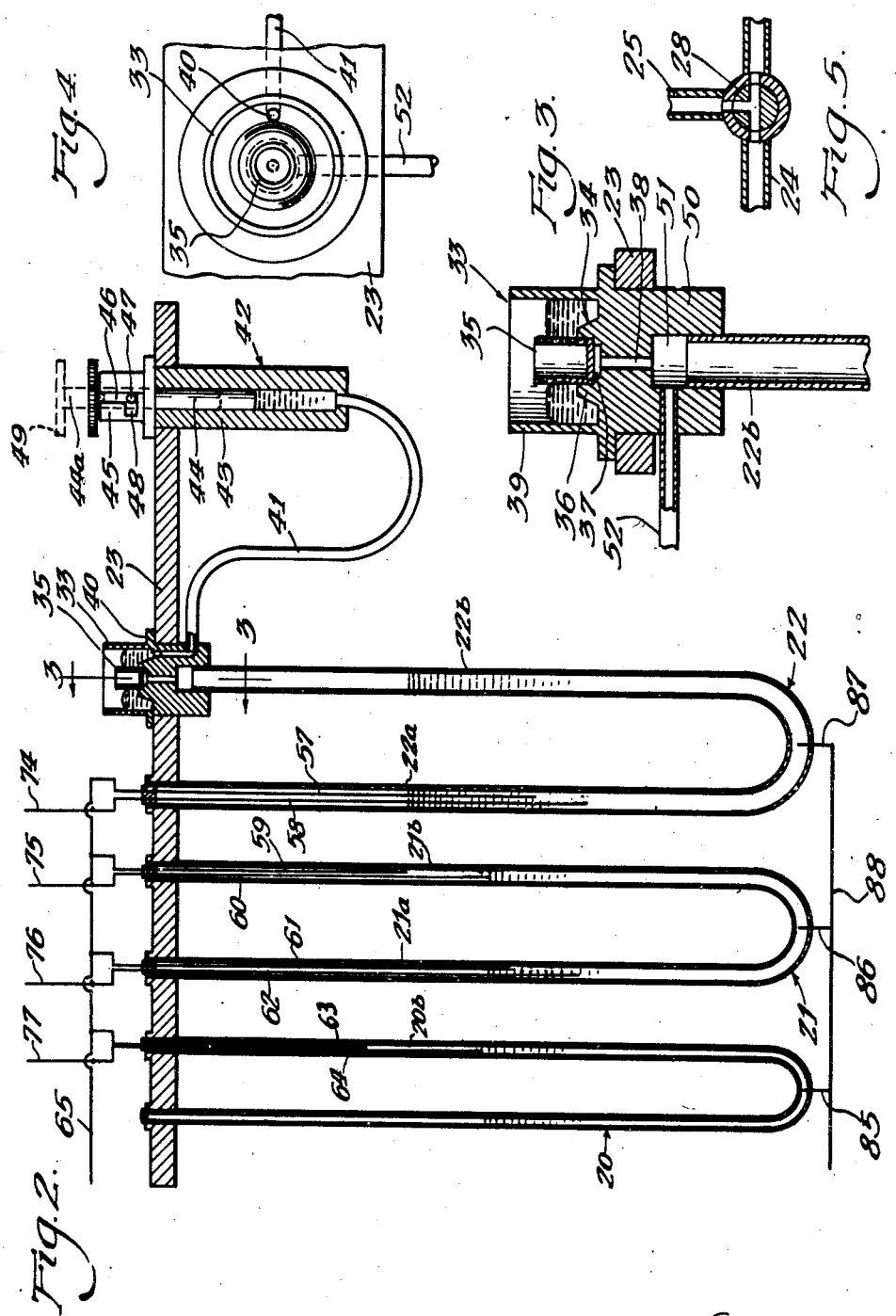
Inventor:
Ernst Walter Rickmeyer
By: Francis A. Pest
Attorney

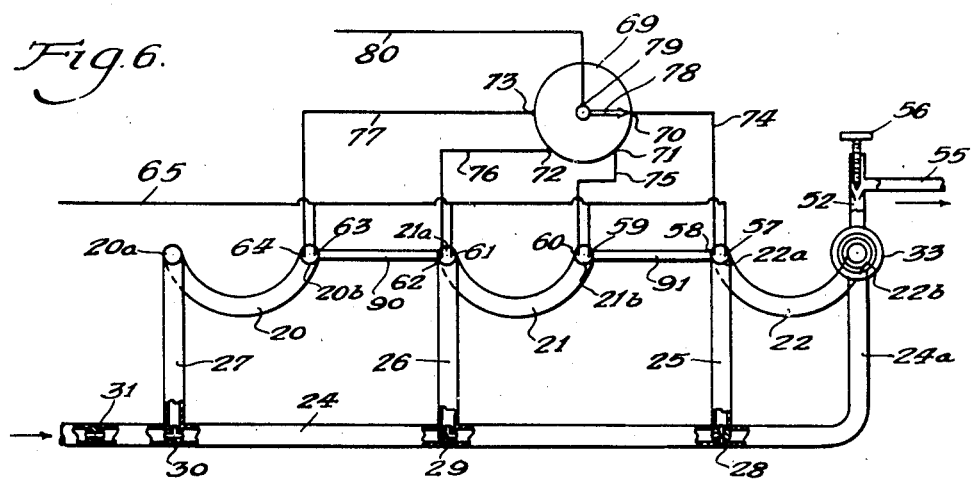
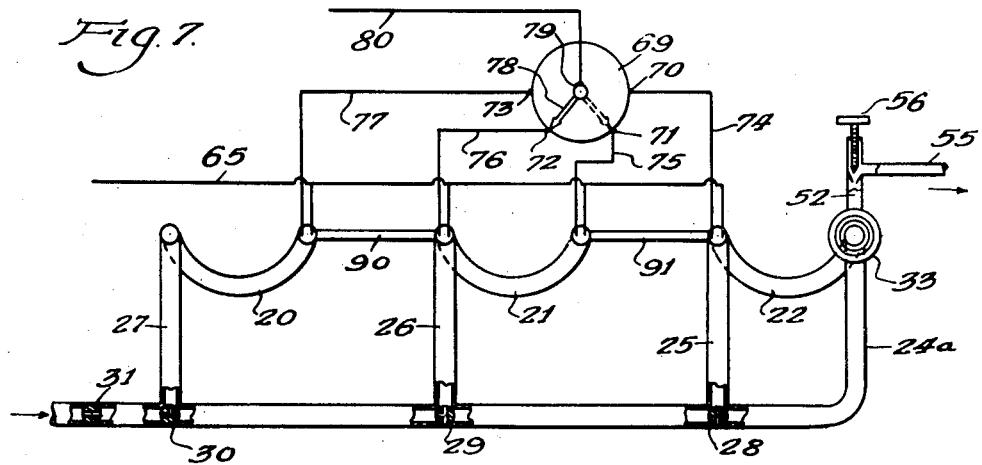
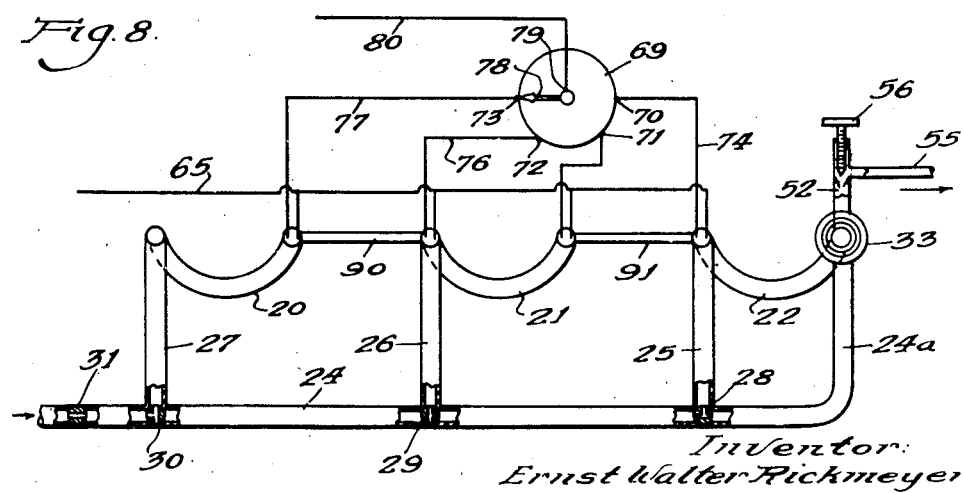

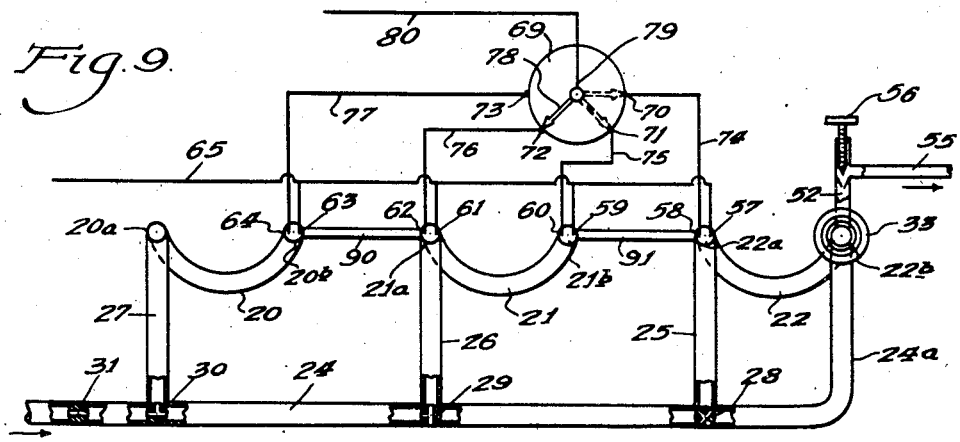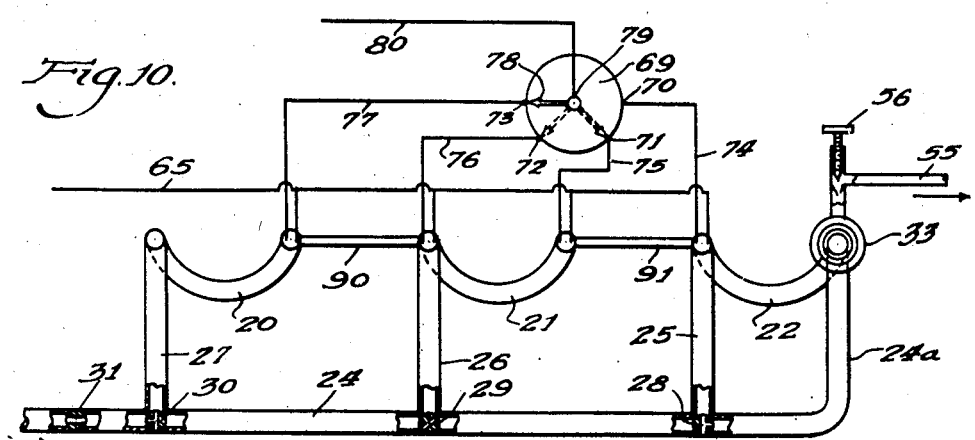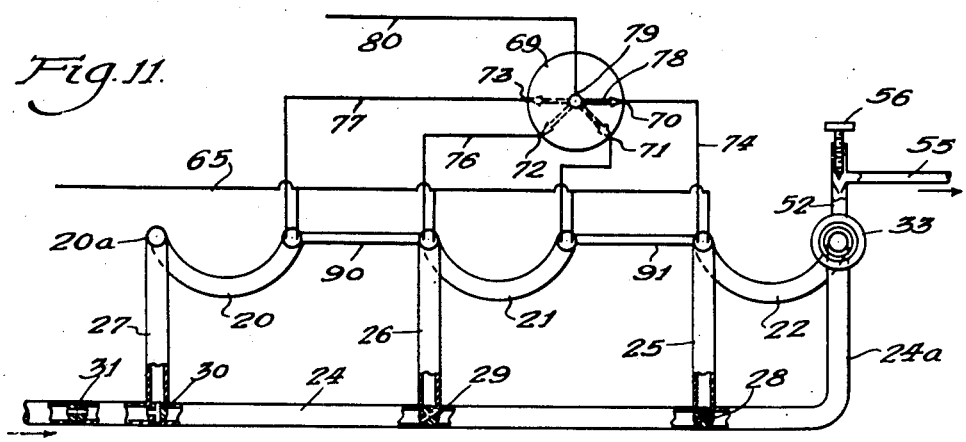

Patented Feb. 1, 1949

2,460,655

UNITED STATES PATENT OFFICE 2,460,655

APPARATUS FOR DETERMINING THE PERMEABILITY OF MATERIALS

Ernst Walter Rickmeyer, Berkeley, Ill., assignor to Jefferson Electric Company, Bellwood, Ill., a corporation of Illinois Application November 16, 1945, Serial No. 629,058

3 Claims. (Cl. 73—38)

The present invention relates to a differential gas flow meter for determining the time required for a fluid, such as a gas, to pass through restricted openings, such as the voids of a porous element.

Specifically, the invention has to do with timing the passage of a gas through the time delay elements of a mercury switch. Generally speaking, a mercury switch of the type embodying the present invention comprises a switch envelope that is divided into two chambers by a partition or wall having a passage or passages therethrough for conducting a body of mercury from one chamber into the other. These passages have restrictions therein so that a time delay can be effected in the flow of mercury through the wall.

The mercury thus entering the second chamber displaces a gas, such as air or the like, that initially fills this second chamber, and the rate of flow of the mercury from the first chamber into the second is necessarily dependent to a large extent on the rate of displacement of the gas. The gas thus displaced from the second chamber passes through the openings in the dividing partition and enters the first chamber that initially contains the mercury.

In building accurate time delay switches employing this principle of operation, it is important to know the rate of transfer of the gas through the passages in the dividing partition, and it is intended that the present invention provide a device for accurately determining this rate of gas flow. This accuracy of timing in the present instance is to within one-hundredth of a second.

The dividing wall between the two chambers is commonly referred to as the time delay element of the mercury switch, and, for purposes of illustration, this dividing wall may take the form of the bottom of a cup made of sintered metal particles. The numerous voids between the particles furnish the necessary passages through which the mercury and the gas can travel. The apparatus forming the subject matter of the present invention is adapted to many different types of time delay elements having a wide range of time delay characteristics.

It is therefore an object of the present invention to provide a relatively simple and yet effective apparatus for accurately measuring the rate of fluid flow through a time delay element. It is intended that the apparatus be adapted to provide different quantities of gas under a relatively wide range of pressures so that the characteristics of a large variety of mercury switches can be duplicated.

The foregoing constitute some of the principal objects and advantages of the present invention, others of which will become apparent from the following description and the drawings, in which Fig. 1 is a more or less diagrammatic, perspective view of the apparatus forming the subject matter of the present invention and including a relatively simple diagram of the electrical selector and timing circuit that forms part of the invention;

Fig. 2 is a more or less diagrammatic vertical sectional view taken through the apparatus, only a portion of the electrical circuit being shown;

Fig. 3 is an enlarged detail sectional view through the seat on which the time delay element is tested, the view being taken on the line 3—3 of Fig. 2;

Fig. 4 is an enlarged plan view of the seat element shown in Fig. 3;

Fig. 5 is an enlarged diagrammatic view illustrating one of the three-way selector cocks shown in Fig. 1;

Fig. 6 is a diagrammatic view illustrating the relative positioning of the three-way selector cocks for one setting of the selector switch, as indicated;

Fig. 7 is a view corresponding somewhat with Fig. 6, but showing the relative positions of the selector cocks for certain settings of the selector switch;

Fig. 8 is a view corresponding to Figs. 6 and 7, but showing the relationship of the selector cocks for still another setting of the selector switch;

Fig. 9 is a view corresponding with the last three figures, but showing the positioning of the selector cocks for different settings of the selector switch;

Fig. 10 is a view corresponding with the last four figures, but showing the conditions for still other settings of the selector switch; and Fig. 11 is a view corresponding to the above views but showing the conditions where all U-tubes are utilized at one time.

Figure 1:
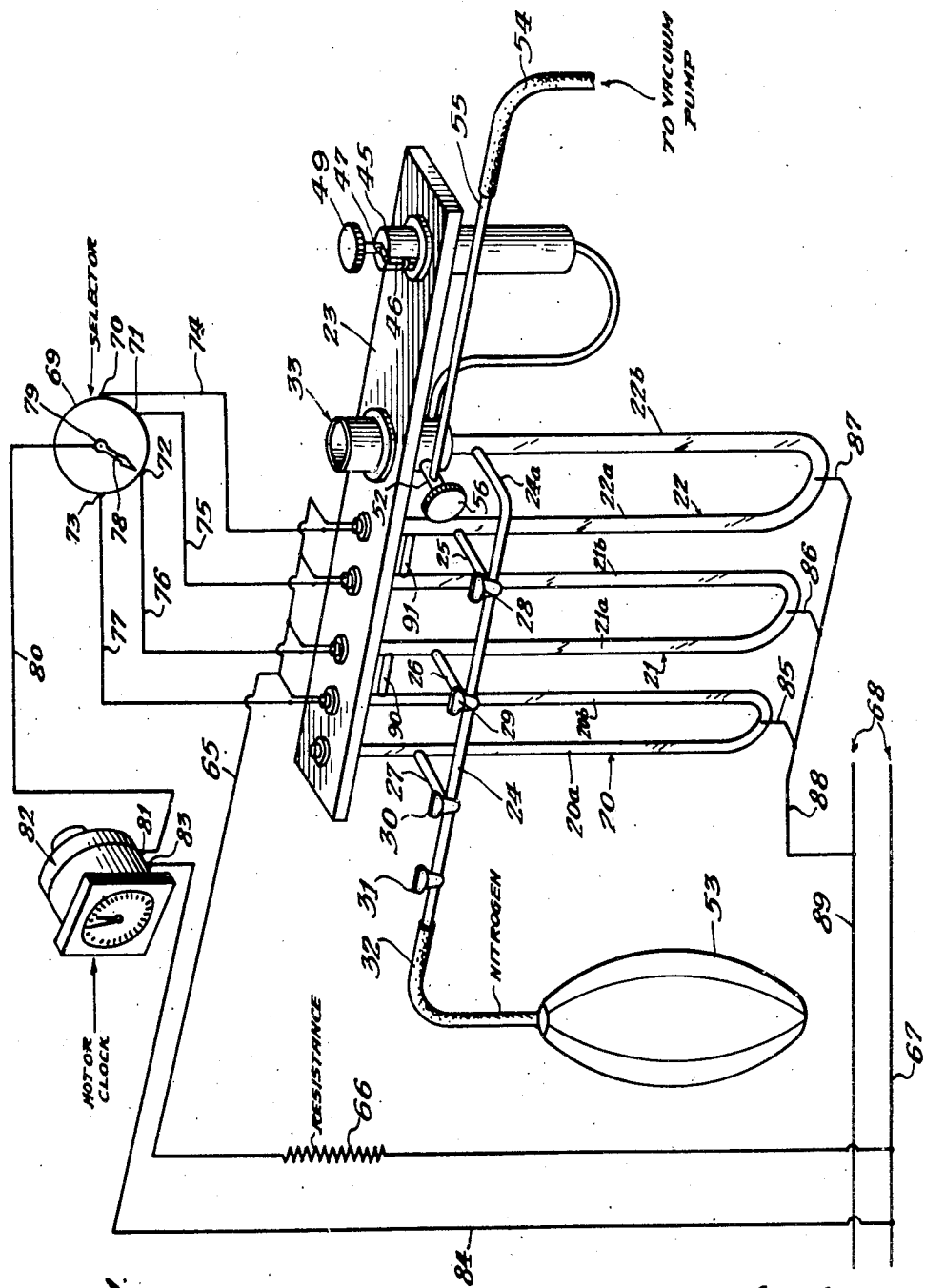

For purposes of illustration, a single embodiment only of the present invention has been selected, but it is recognized that many variations may be made in the apparatus disclosed without departing from the scope of the invention.

Referring to the drawings and particularly to Fig. 1, the apparatus forming the subject matter of the present invention comprises, generally, three U-tubes indicated at 20, 21 and 22, supported in some suitable manner on a supporting frame 23, certain portions of which tubes are interconnected through a tube 24. Each of the U-tubes 20, 21 and 22 has a pair of parallel arms, respectively, indicated at 20a and 20b, 21a and 21b, and 22a and 22b. The tube 24 is connected to arm 22b through a connecting tube portion 24a, and is further connected with arm 22a through a connecting tube 25, to arm 21a through connecting tube 26, and to arm 20a through connecting tube 27. Arms 20b and 21a are connected by tube 90, and arms 21b and 22a are connected by tube 91. Three-way selector cocks 28, 29, and 30 are located at the entrance, respectively, of connecting tubes 25, 26, and 27. A simple stopcock 31 is provided adjacent to the free end of the tube 24. A gas supply bag 53 having a supply of nitrogen, for example, is connected to this free end of the tube 24 through suitable tubing, indicated at 32.

At the upper end of the arm 22b of the U-tube 22 is a mercury sealable chamber, generally indicated at 33. This chamber 33 is provided with a seat portion 34 (see Fig. 3) adapted to receive a cup element 35 that constitutes the time delay element of a mercury switch. The seat 34 is provided with upstanding walls 36 within which walls the cup 35 is adapted to be received. The bottom of the seat element 34 is provided with a circular recess 37 that extends below the bottom of the cup 35, and a passage 38 passes downwardly from substantially the center of this recess 37. The arm 22b of U-tube 22 communicates with this passage 38. The chamber 33 is further provided with upstanding walls 39 that are horizontally spaced from the seat portion 34 and project above the uppermost edge of the cup 35 when the cup is resting on the seat 34.

Referring to Fig. 2, a second passage 40 communicates with the chamber 33 and projects downwardly therefrom and is connected at its free end with tubing 41. This tubing 41 communicates with the bottom of a pump, generally indicated at 42. This pump comprises a cylinder indicated in Fig. 2 at 43 having a plunger 44 that is adapted to move from an upper position shown in broken lines at 44a to a lower position indicated in solid lines. A flange 45 projects above the cylinder 43 and is provided with a slot 46 in the wall thereof. A lug 47 projects laterally from the plunger 44 into the slot 46 and is adapted to move vertically in this slot. When the plunger 44 is in its raised position, the lug 47 is disposed at the top of the flange 45. The slot 46 is provided with a horizontal portion 48 that is adapted to receive the lug 47 when the plunger 44 is in its lower position.

The pump 42 and the tube 41 normally contain a supply of mercury. When the plunger 44 is in its raised position 44a, the mercury seeks a common level and is contained entirely within the pump 42 and the tube 41. When the plunger 44 is forced downwardly by application of pressure against the knob 49 at the top of the plunger, mercury is forced through tube 41 into passage 40, and thence into the chamber 33. The mercury level in this chamber 33 rises as the plunger 44 is further pushed downwardly until it assumes a position above the seat 34 and adjacent to the sides of the cup 35, as shown in Figs. 2 and 3. When the plunger 44 is in its lower position, it is rotated in a clockwise direction so that the lug 47 enters the passage 48, thereby locking the plunger in its lower position. The mercury in chamber 33 thus seals from the atmosphere any gap between the cup 35 and the seat 34. The mercury is returned to the cup 42 by merely unlocking the plunger 44 upon rotating the plunger in the counter-clockwise direction and allowing it to rise to its dotted line position 44a. When the cup 35 is seated in the chamber 33, as shown in Fig. 3, it is to be noted that the recess 37 has a diameter corresponding to the inside diameter of the cup 35.

Projecting below the chamber 33 is a solid member 50 through which the passage 38 extends and in which is provided a slot 51 for receiving the upper end of the arm 22b of U-tube 22. A tube 52 likewise enters the solid member 50 and terminates in the slot 51 directly above the end of arm 22b of the U-tube 22. A vacuum pump (not shown) is connected by a rubber tube 54 to tubing 55, the latter of which is connected to the tube 52. A valve 56 is adapted to control the vacuum line. As shown in Fig. 3, the tube 52 communicates with the arm 22b of U-tube 22 through the solid member 50.

As best shown in Fig. 2, each of the arms 22a, 21b, 21a, and 20b is provided with a pair of electrodes 57, 58 (in arm 22a), 59, 60 (in arm 21b), 61, 62 (in arm 21a), and 63, 64 (in arm 20b). Electrodes 58, 60, 62 and 64 are relatively longer, and thus project further into their respective U-tube arms than electrodes 57, 59, 61 and 63 respectively. As shown in Fig. 1, the shorter electrodes 57, 59, 61 and 63 are connected by a common wire 65 through a resistance 66 to one side 67 of electrical mains indicated at 68. A selector switch 69 is provided with separate contacts 70, 71, 72, and 73, to which the longer electrodes 58, 60, 62 and 64 are respectively connected through wires 74, 75, 76 and 77 respectively. A selector contact 78 is adapted to rotate about an axis 79, so as to engage one of the contacts 70, 71, 72, or 73. This selector member 79 is connected through a wire 80 to one terminal 81 of a clock motor 82. The other terminal 83 of the clock motor 82 is connected through a wire 84 to a wire 67 of electric mains 68. In the bottom of U-tubes 20, 21, and 22 are electrodes 85, 86, and 87, respectively, that are connected to a common wire 88, which in turn terminates at the opposite wire 89 of mains 68. As best shown in Fig. 2, mercury is shown in each of the U-tubes 20, 21, and 22.

The cup 35 that is to be tested with the apparatus just described has a restricted passage or passages through the bottom thereof. As shown, the cup is made from metal particles, such as steel or nickel, that are compressed together in a cup-shaped mold and are then sintered so as to hold the particles together. The spaces between the particles form a large number of interconnecting voids which serve as restricted passages through the bottom of the cup. It is through these passages that the mercury and gas flow during the operation of the mercury switch that employs the cup as its time delay element. The present device times the flow of gas through these voids with extreme accuracy, the maximum tolerance being about .01 second.

Operation

When operating the present apparatus, the mercury level at the outset is disposed below the seat portion 34 in the chamber 33. The cup 35 to be tested is placed in an upright position on the seat portion 34, and then it is sealed in place by operation of the plunger 44.

Now referring to Figs. 6–10, inclusive, there are illustrated numerous arrangements for utilizing the apparatus in testing time delay cups having different delay characteristics. The views are diagrammatic only, and the arrangement of parts of the apparatus is slightly different from that shown in Figs. 1 and 2. This is done for purposes of clarity; for example, the tube 52 and valve 56 are shown as disposed on the opposite side of the chamber 33 from that illustrated in Fig. 1.

The different settings on the selector switch 69 represent different conditions of timing, depending upon the relative positioning of the selector cocks 28, 29, and 30.

Referring to Fig. 6, the selector switch 69 is there shown adjusted so as to place electrodes 57 and 58 in the circuit to the clock motor 82. The stopcock 31 is turned to the open position, and both selector cocks 29 and 30 are adjusted to the same position as shown while selector cock 28 is turned so as to place only the tube 25 into communication with the long tube 24. At this point, the valve 56 is opened, and the vacuum pump is operated so as to draw a vacuum in arm 22b of the U-tube 22. During the drawing of this vacuum, the mercury in U-tube 22 rises in arm 22b, and consequently the mercury level in tube 22a is lowered, nitrogen gas displacing the mercury in arm 22a through tube 24 and selector cock 28. Nitrogen is employed to eliminate as much as possible difficulties that would otherwise be encountered as a result of arcing that takes place upon making and breaking the circuit between the mercury and the electrodes.

Both U-tubes 20 and 21 are made inoperative as a result of the setting of selector valves 28—30, inclusive, in the position shown in Fig. 6 because of the fact that both sides of these two U-tubes are subjected to equal nitrogen pressure. This result is accomplished by the fact that connecting tubes 90 and 91 connect arms 20b and 21a, and 21b and 22a, respectively. The vacuum is continued to be drawn on arm 22b of U-tube 22 until the mercury level in arm 22a (Fig. 2) is disposed below both electrodes 57 and 58. When this condition has been reached, valve 56 is closed to shut off the vacuum line 55.

Referring to Fig. 2, it can be seen that under these conditions, with the mercury level in arm 22b of U-tube 22 considerably higher than the level of the mercury in arm 22a, air will be drawn in from the outside through the bottom of cup 35 into the arm 22b by the lowering of the mercury level in the arm 22b, and the corresponding rise in the mercury level in arm 22a. As soon as the mercury in arm 22a has risen sufficiently to engage the lower end of electrode 58, an electrical circuit is completed between electrode 57 in the bottom of U-tube 22 and the electrode 58, and hence through the clock motor 82. Thus, the clock commences to operate to time the rise in the mercury in arm 22a until the mercury level engages the lower end of electrode 57, at which time a second circuit from the lower electrode 57 through electrode 57, and hence through resistance 66, is closed. This latter circuit has a relatively lower resistance therein than the first circuit to the clock motor 82, and hence the closing of the latter circuit shorts out the clock motor, thereby discontinuing the operation of the clock. In this manner, it can be seen that the clock operates only during the period when the mercury is rising from the level corresponding to the lower end of electrode 58 until it reaches the level corresponding to the lower end of the shorter electrode 57. The rate of this rise in mercury level in arm 22a of the U-tube, of course, is dependent upon the rate of flow of air through the passages in the bottom wall of the time delay cup 35.

It is to be noted that the U-tubes 20—22, inclusive, have arms of different cross sectional areas. In the case of U-tube 22, a relatively large amount of air can be taken in for each increment of volume of mercury displaced. Thus, a relatively large amount of air must pass through the restricted passages in the bottom wall of the time delay cup 35 during the timing period. This U-tube, then, is intended to meter time delay cups having relatively large passages through the bottom wall.

In Fig. 7, the apparatus is shown in position to utilize only U-tube 21 for metering the passage of air through the time delay cup 35. In this instance, when the vacuum is drawn, both sides of U-tube 22 are open to the vacuum line, but only arm 21b of U-tube 21 is evacuated through the connecting tube 91. The opposite arm 21a of U-tube 21 is shown in communication with the nitrogen supply so that a charge of nitrogen is taken into this arm to displace the mercury that is lowered in arm 21a as a result of the evacuation. Both arms of U-tube 20 are subjected to the pressure of the nitrogen, and therefore this U-tube is rendered inoperative.

As a result of placing arm 21b of U-tube 21 under vacuum, the mercury level in arm 21a is lowered while the mercury level in arm 21b rises. The vacuum pump is caused to draw on arm 21b until the level of the mercury is below the lower end of electrode 61 in arm 21a. This is the condition desired when the pointer 78 on the selector 69 is arranged as shown in solid lines in Fig. 7. When the vacuum line is again shut off, air again is taken into arm 22b of U-tube 22 through the bottom wall of cup 35, and finally returns to arm 21b through tube 24a, selector cock 28, connecting tube 25, and finally through connecting tube 91. This return of air into arm 21b causes the mercury to rise in arm 21a until it reaches the lower end of electrode 62, at which time the clock motor is again placed in a closed circuit to start the operation of the clock. Once again, the clock operates until the clock motor is shorted out by the mercury, when it reaches the lower end of electrode 61. In this instance, a smaller amount of air is required to raise the mercury in arm 21 a given distance, and hence U-tube 21 is intended for use in a faster operating time delay element than in the case of the first one described.

Again referring to Fig. 7, it is noted that the indicator 78 of selector 69 may be disposed so as to place electrodes 59 and 60 in circuit instead of electrodes 61 and 62. Under these conditions, the timing by the clock is effected while the mercury level in arm 21b is dropping, the actual timing taking place during the time the mercury level is passing between the lower ends of electrodes 59 and 60. Since the spacing between the lower ends of electrodes 59 and 60 differs from that between the lower ends of electrodes 61 and 62, it is to be noted that U-tube 21 can be utilized for two different timing conditions, one of which involves a relatively short timing interval, whereas the other involves a longer timing interval.

Fig. 8 illustrates the settings of the selector 28, 29, and 30, and the selector switch 69 for the condition where U-tube 20 only is to be utilized and both U-tubes 21 and 22 are made ineffective by balanced pressure conditions on both arms of these latter two tubes. The operation of the system is the same as previously described.

So far, one U-tube only has been utilized for metering the gas flow through a time delay cup. The principal difference between the various conditions thus far described has been one involving the amount of gas that is required to flow through the time delay element during the timing cycle.

Under some conditions, it may be desirable to combine certain pairs of U-tubes in order to obtain different timing conditions. By thus combining U-tubes, the resultant mercury head that can be obtained will be the combination of the heads effected in each tube that is placed in operation.

As an example of utilizing more than one U-tube at a time, Fig. 9 illustrates the proper setting of the selector cocks for a condition where U-tubes 21 and 22 only are utilized. Selector cock 28 is adjusted so as to entirely close off connecting tubes 24a and 25 from the supply of nitrogen, and further to allow the vacuum to be drawn only on arm 22b by the vacuum line 55. The change in mercury level in U-tube 22 caused by the vacuum effects a change in mercury level in U-tube 21 by virtue of the fact that arm 22a is connected to arm 21b through connecting tube 91. Nitrogen is drawn into arm 21a as a result of this change in mercury level in the U-tube 21. After a sufficient vacuum has been created in arm 22b, the timing is accomplished in the same manner as before, except that in this instance the indicator 78 can be adjusted to any one of three positions, as indicated in the one solid line position and the two dotted positions shown in Fig. 9. Each position will produce a timing period different from the other. In this instance, the suction that pulls air from the atmosphere through the time delay element is greater than in any of the previous instances because of the additional suction head created by the additive effect of the two mercury levels in U-tubes 21 and 22.

Fig. 10 shows the apparatus in condition to utilize U-tubes 20 and 21 in series, and Fig. 11 shows the apparatus in condition to utilize all three U-tubes in series.

Thus, it can be seen that the apparatus is adapted to be used for metering the passage of gas through time delay elements having a rather wide range of different time delay characteristics. Volumes of gas together with pressures behind the gas can be varied so as to reproduce actual operating conditions of a large number of different mercury switches having time delay characteristics that are varied widely. In actual operation, the present apparatus has been found to be accurate in timing within .01 second or less.

As illustrated herein, the time delay cup 35 is disposed with its open side facing upwardly while the porosity of the bottom wall is tested as described. It may be desirable to determine the porosity of the side walls as well, and for making this test the cup would be disposed in the chamber 33 (Fig. 3) in an inverted position. The mercury level would just sufficiently cover the sides of the cup to effect a seal but those portions of the side wall whose porosity is in question are to be left above the mercury level.

Thus the structure and operation of the apparatus forming the subject matter of the present invention has been described. Though a cup-shaped time delay element has been the specimen used for purposes of demonstrating the utility of this apparatus, it is to be understood that many other articles can be tested on this type of apparatus. Solid plugs or various shaped articles that are intended for use as filters, strainers or the like may be tested in the same manner. The porosity of bearings or other articles of sintered metal, for example, as well as many other articles may likewise be tested.

I claim:

1. Apparatus comprising a U-tube assembly including a plurality of U-shaped tubes, a body of mercury partially filling each U-tube, means for creating a mercury pressure head in the U-tube assembly, a seat for supporting a time delay element and having an aperture therethrough, the time delay element being supported over the aperture, the U-tube assembly being connected to the seat and being in communication with the aperture so that fluid may pass through the time delay element disposed on the seat through the passage and into the U-tube assembly under the influence of the mercury pressure head in the U-tube, and clock means for timing the flow of said fluid through the time delay element.

2. Apparatus comprising a U-tube assembly including a plurality of U-shaped tubes having their arms connected in series by tubes, a body of mercury partially filling each U-tube, means for altering the pressure in an arm of each U-tube including a source of fluid, passage means connecting the fluid source with said arms, and valve means in the passage means for selectively regulating the flow of the fluid, a seat having an aperture disposed over one end arm of the U-shaped tubes, and timing means for measuring the rate of flow of a fluid through the aperture including electrodes adapted to project into the mercury, a timing clock, and an electrical circuit connecting the electrodes to the clock.

3. Apparatus comprising a U-tube assembly including a plurality of U-shaped tubes having their arms connected in series by tubes, a body of mercury partially filling each U-tube, means for altering the pressure in an arm of each U-tube including a source of fluid, passage means connecting the fluid source with said arms, and valve means in the passage means for selectively regulating the flow of the fluid, a seat having an aperture disposed over one end arm of the U-shaped tubes, and timing means for measuring the rate of flow of a fluid through the aperture including electrodes adapted to project into the mercury, a timing clock, and an electrical circuit connecting the electrodes to the clock, the seat being adapted to support a porous element, and means for sealing the element on the seat over the aperture.

ERNST WALTER RICKMEYER.

REFERENCES CITED

The following references are of record in the file of this patent:

UNITED STATES PATENTS

| Number | Name | Date |
|---|---|---|
| 595,398 | Louis | Dec. 14, 1897 |
| 1,538,793 | Gallagher et al. | May 19, 1925 |
| 2,021,948 | Schopper | Nov. 26, 1935 |
| 2,104,047 | Long | Jan. 4, 1938 |
| 2,293,488 | Bays | Aug. 18, 1942 |

FOREIGN PATENTS

| Number | Country | Date |
|---|---|---|
| 372,777 | Great Britain | May 11, 1932 |